(12) United States Patent
Lacy

(10) Patent No.: US 11,232,064 B2
(45) Date of Patent: Jan. 25, 2022

(54) ADAPTIVE DOCUMENT CURATION

(71) Applicant: salesforce.com, inc., San Francisco, CA (US)

(72) Inventor: Robert Lacy, Burlington, MA (US)

(73) Assignee: salesforce.com, inc., San Francisco, CA (US)

( * ) Notice: Subject to any disclaimer, the term of this patent is extended or adjusted under 35 U.S.C. 154(b) by 172 days.

(21) Appl. No.: 16/776,228

(22) Filed: Jan. 29, 2020

(65) Prior Publication Data

US 2021/0232534 A1 Jul. 29, 2021

(51) Int. Cl.
*G06F 16/11* (2019.01)
*G06N 20/00* (2019.01)
*G06F 16/93* (2019.01)

(52) U.S. Cl.
CPC ............ *G06F 16/113* (2019.01); *G06F 16/93* (2019.01); *G06N 20/00* (2019.01)

(58) Field of Classification Search
CPC ...... G06F 16/11; G06F 16/185; G06F 16/214; G06F 16/119; G06F 11/203
See application file for complete search history.

(56) References Cited

U.S. PATENT DOCUMENTS

2018/0373722 A1* 12/2018 Ulasen ................... G06N 5/025
2019/0251193 A1* 8/2019 Singuru ................ G06F 16/215

OTHER PUBLICATIONS

MLFAT: A Machine Learning File Archival Tool, Robert Carreras (Year: 2012).*

* cited by examiner

*Primary Examiner* — Hau H Hoang
(74) *Attorney, Agent, or Firm* — Butzel Long

(57) ABSTRACT

An adaptive document curation method. A machine learning model is trained on a first library of documents to assign staleness scores to documents, each indicating a confidence that the document to which it is assigned should be archived. If a document has a staleness score at least equal to a threshold, the document is identified as a candidate to be archived or deleted.

16 Claims, 5 Drawing Sheets

S200

S302

S304

US 11,232,064 B2

ADAPTIVE DOCUMENT CURATION

BACKGROUND

Internal document management systems have seen increased use across all levels of business organizations. Such systems typically allow for users to create and/or store documents within the system for viewing, editing, and other management by some or all other users in the system, and provide for collaborative editing, user review, and the like. Typically documents are sorted into folders, categories, or other groupings defined by the system and/or the users. Users also typically can filter or sort the documents using various types of document attributes, such as name, creator, date, and the like, or using user-generated fields such as document tags, categories, and the like.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Figure 1:
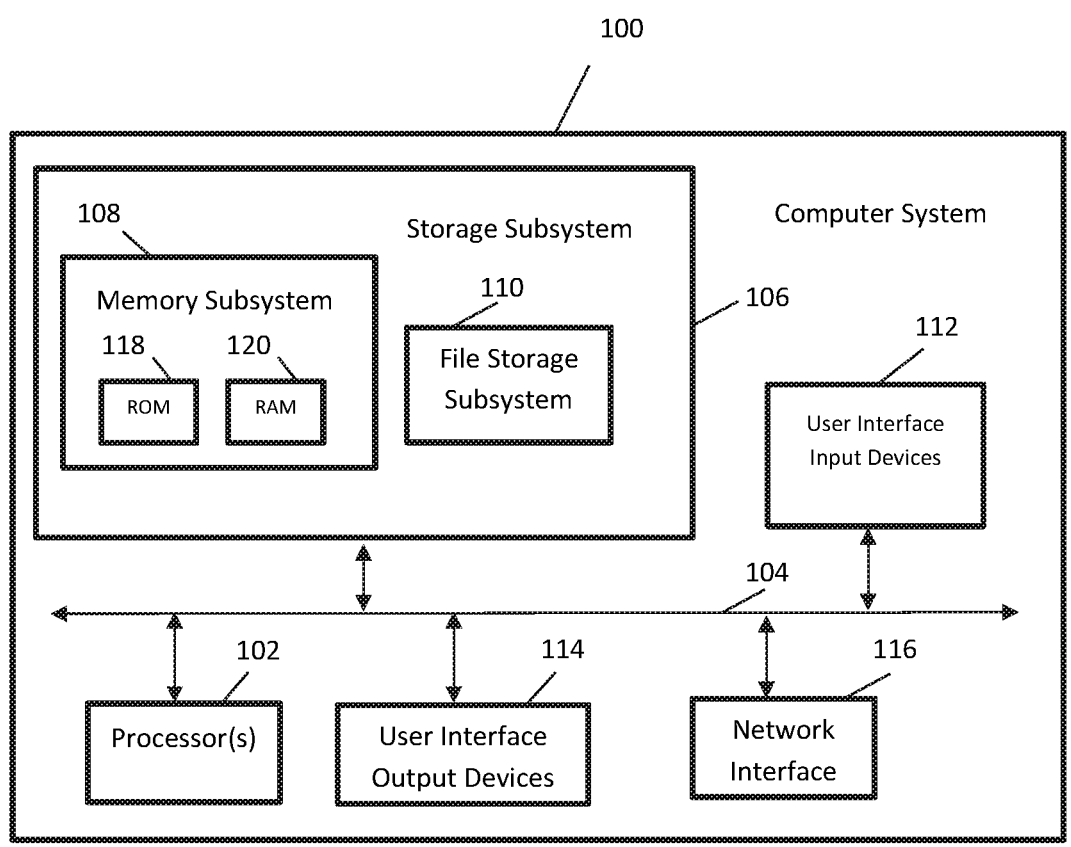
FIG. 1 illustrates a computer system suitable for use with the disclosed subject matter.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

As previously disclosed, many document management systems and collaborative editing platforms are known. However, they typically suffer from the same flaw—over time, and as the number and type of documents managed by the system grow, they become less useful. For example, it often becomes harder for users to find the specific document they need, and often the information that is available is outdated or even incorrect. The document management platform incurs a growing maintenance burden and readers begin to second guess the information they do find. Eventually, many such systems reach a tipping point where the effort required to maintain documents within the platform outweighs the benefit.

The present disclosure relates to an adaptive method and system for document curation within a document management platform. The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Techniques and systems disclosed herein may also provide more efficient computerized document management systems, which can more quickly and accurately surface documents of interest to a particular user. Thus, the computerized document management system itself may require less computational overhead and maintenance than existing document management systems. For example, in some cases a machine learning model may be used to identify document candidates for archiving or editing. These candidates could be presented to users to make a determination on whether the document candidate should be archived. This determination may serve as a way to ensure proper action is taken, and allow for constant retraining of the model itself. Because the system can perform these calculations ahead of any interaction with the user, a smaller number of documents can be presented for manipulation by the user, thereby reducing the processing overhead required for each individual user. Since document management systems typically allow concurrent access by many users, this efficiency increase may be multiple many-fold over the entire system.

To do so, embodiments disclosed herein may generate and use a "staleness score" for one or more documents and/or folders within the document management system. The staleness score indicates how relevant the system believes the document to be—a higher staleness score suggests that the document is less relevant, while a low staleness score suggests that the document currently is more relevant. Generally the system will move toward archiving or deleting documents that have higher staleness scores so that they are not included in the initial list of documents presented to a user. In some systems, stale documents may be archived so that they are still accessible to users, such as via a separate interface. Generally an archived document is still available within the system but will not be included in the initial or default views of documents presented to users, thus requiring users to actively seek out archived documents. As described in further detail below, if a user does seek out and access or edit an archived document, this may decrease the staleness score of the document since doing so may change various attributes of the document such as date accessed, last edit date/time, and the like. In some cases, stale documents may be deleted or suggested for deletion from the system, at which point they generally will not be available other than via an administrative override to recover such a document.

FIG. 1 is a block diagram of an example computer system 100 for document curation. The computer system 100 may include at least one processor 102 that communicates with a number of peripheral devices via bus subsystem 104. These peripheral devices may include a storage subsystem 106 including, for example, memory subsystem 108 and a file storage subsystem 110, user interface input devices 112, user interface output devices 114, and a network interface subsystem 116. The input and output devices allow user interaction with computer system 100. Network interface 116 may provide an interface to outside networks, including an interface to corresponding interface devices in other computer systems.

User interface input devices 112 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 100.

User interface output devices 114 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 100 to the user or to another machine or computer system.

Storage subsystem 106 stores programming and data constructs that provide the functionality of some or all of the modules and methods described herein. These software modules are generally executed by processor 102 alone or in combination with other processors.

The memory 108 used in the storage subsystem may include a number of memories including a main random access memory (RAM) 118 for storage of instructions and data during program execution and a read only memory (ROM) 120 in which fixed instructions are stored. The file storage subsystem 110 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 110 in the storage subsystem 106, or in other machines accessible by the processor.

Bus subsystem 104 may provide a mechanism for letting the different components and subsystems of computer system 100 communicate with each other as intended. Although bus subsystem 104 is shown schematically as a single bus, alternative implementations of the bus subsystem may use multiple busses.

Computer system 100 may be of varying types including a workstation, server, computing cluster, blade server, server farm, or any other data processing system or computing device. Due to the ever-changing nature of computers and networks, the description of computer system 100 depicted in FIG. 1 is intended only as one example. Many other configurations of computer system 100 are possible having more or fewer components than the computer system illustrated in FIG. 1.

Figure 2:
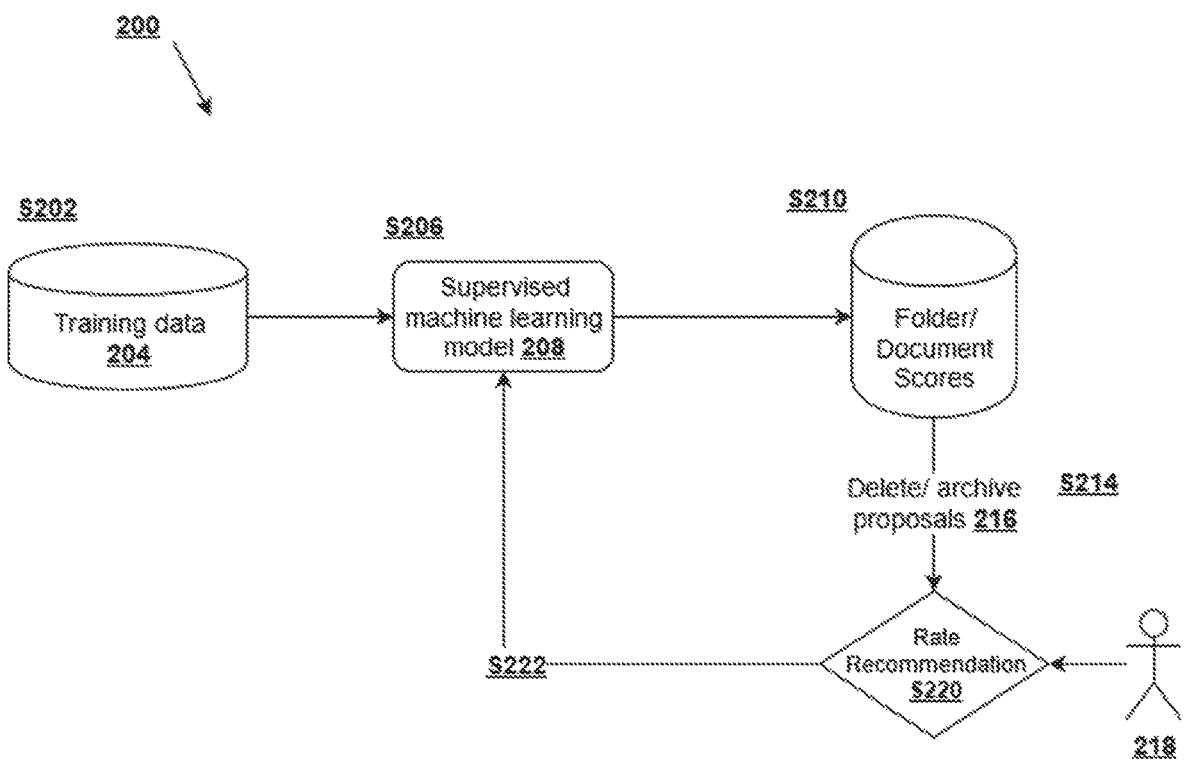
FIG. 2 illustrates a flow chart for performing an implementation of an adaptive document curation method as disclosed herein.

A flowchart for performing an implementation of a method 200 of identifying similar work items in a document curation system is illustrated in FIG. 2.

At step S202, training data 204 may be input into the system 100. At step S206, a supervised machine learning model 208 or other automatic analysis technique may be created and stored in the storage subsystem 106. Although in some cases a supervised machine learning model may be preferred, more generally any suitable machine learning or other artificial intelligence approach may be used. At step S210, at least one folder staleness score record and/or document staleness score record 212 may be received by and stored in a database 212a within the storage subsystem 106. At step S214, one or more recommendations for document deletion and/or storage 216 may be suggested to a user 218 as recommendations for document deletion and/or archiving. At decision step S220, the user 218 may rate the recommendations, i.e., whether the user has determined to accept the recommendations for documents to be deleted and/or archived 216 or whether the user has determined to reject the recommendations for documents to be deleted and/or archived. And at step S222, the user's input from step S220 may be stored in the storage subsystem 106 and may be used by the processor 102 to update the machine learning model 208 to provide more precise future staleness scores. The method 200 will be discussed in more detail below.

Figure 3:
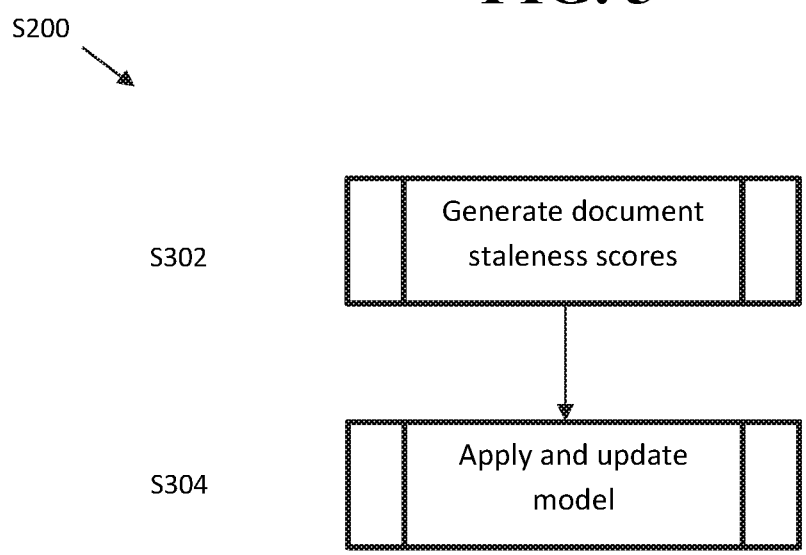
FIG. 3 illustrates a flow chart for performing two phases of the adaptive method illustrated in FIG. 2.

As illustrated in FIG. 3, the method 200 may include two phases of operation, or may be modeled as operating within such phases. Phase 1 is illustrated as step S302, which includes generating document staleness scores. Phase 2 is illustrated as step S304, which includes applying staleness scores and updating machine learning model.

Figure 4:
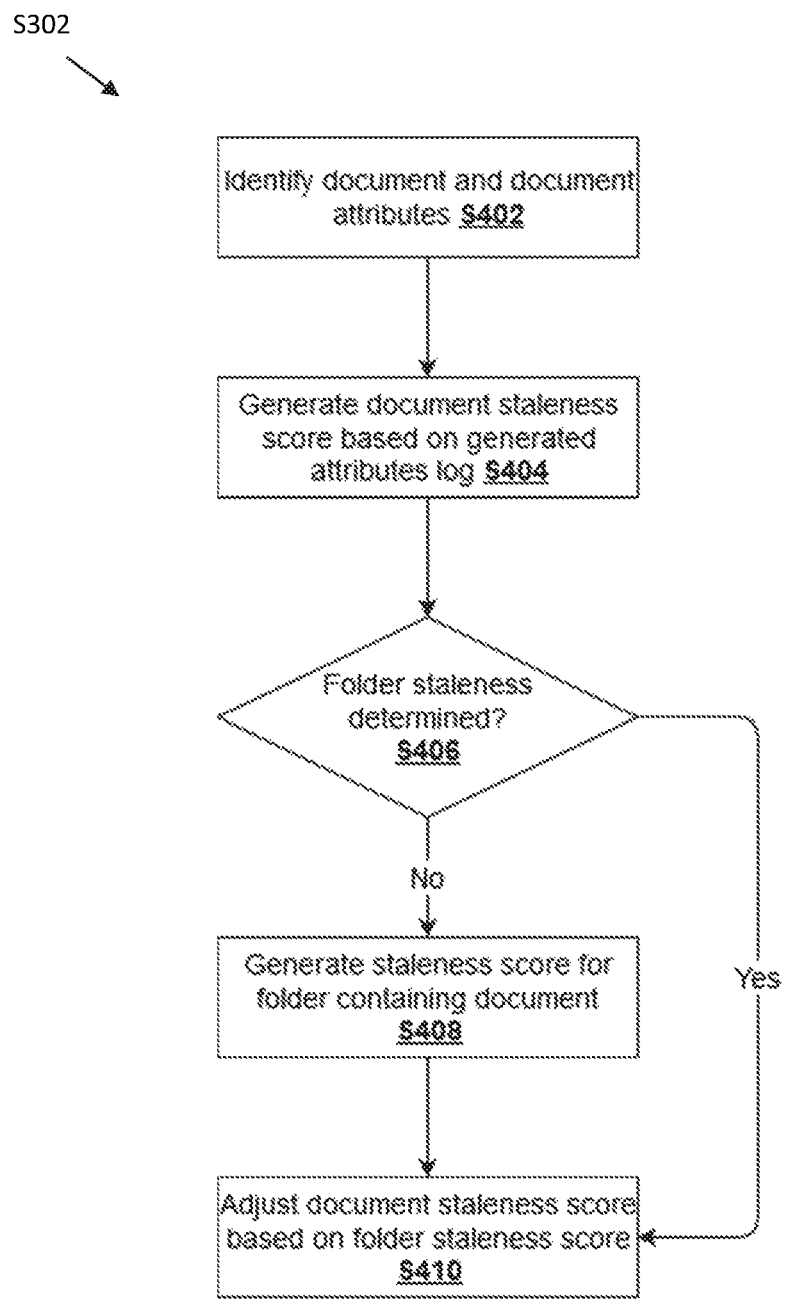
FIG. 4 illustrates a flow chart for performing a first phase of the adaptive method illustrated in FIG. 2.

As illustrated in FIG. 4, phase S302 may begin with step S402. At step S402, the system may identify a document within a folder. A folder may be a library of documents in a common context, where documents may be assigned to one or more folders automatically within the system or manually by one or more users. For the identified document, the system may identify document attributes. For example, the attributes may include attributes such as creation date, last edit date, last view date, count of unique edits in past N months, count of unique editors in past N months, count of unique viewers in past N months, count of unique non-editor viewers in past N months, count of documents linked from document, average staleness score of linked documents, count of documents that link to this document, average staleness score of documents that link to it and an aggregate staleness score of the folder containing the document. "N" may be a value set by the user or the system, or determined automatically during the machine learning process at S206 and/or the feedback cycle at S220. An average staleness score for a folder containing the document will be discussed in more detail below.

At step S404, the system may generate a staleness score for the document. To generate a staleness score, the system may assign a value to each attribute identified in step S402. For example, a creation date, i.e., age, greater than a threshold value may generate a score of 1 for the age attribute and a creation date that is less than or equal to the threshold value may generate a score of 0 for the age attribute. A count of unique edits in the past N months higher than a threshold value may generate a staleness score of 1 for the unique edits attribute and a count of unique edits in the past N months less than the threshold value may generate a staleness score of 0 for the unique edits attribute.

It is not necessary that each attribute be scored or a 1 or a 0. It may be possible, upon user instruction or programming of the system, to assign weights to each attribute so that each attribute may have a unique highest score and/or a negative score. For example, a document age of less than one day may receive a score of negative two (−2) and an average score of linked documents of three may receive a score of 5. A staleness score of the document may be the sum of each of the attribute scores available. Therefore, in the present example, the document score would be 3 (if all other attributes are zero).

Step S406 may be a decision step in which the system establishes whether a staleness score for the folder containing the document has been determined. If no staleness score for the folder has been determined, the process proceeds to step S408 to generate a staleness score for the folder containing the document. If a staleness score for the folder has already been determined, the process proceeds to step S410 to adjust the document staleness score.

At step S408, a staleness score for the folder may be generated. To generate a staleness score for the folder, the system may determine an average staleness score of all documents within the folder and of any subfolders within the folder. The average staleness score of all documents within the folder may be considered the staleness score of the folder. For example, if Folder F contains three documents, Document A, having a staleness score of 75, Document B, having a staleness score of 50 and Document C, having a staleness score of 40, the staleness score of Folder F is 55. The folder score may now be used to adjust the document score.

At step S410, the document staleness score may be adjusted based on a staleness score of the folder staleness in which the document is stored. The staleness score of the folder may be adjusted according to the following equation:

$$\text{Adjusted staleness score} = \frac{\sum_{1}^{n} \text{folder score } (n)/n^2}{\sum_{1}^{n} 1/n^2}$$

where: "folder score" is the score calculated at step S408, and "n" is the number of subfolders within the folder. A benefit to using scores of all of the subfolders within the folder may be that the staleness score of the document is less affected by the staleness score of each subfolder the larger the degree of separation from the document the subfolder becomes.

The following example illustrates adjustment of the document staleness score using equation (1) above. Document D is in the following path of documents: Folder X/Folder Y/Folder Z/document D. The folder staleness scores are as follows: Folder X: 81, Folder Y: 60, and Folder Z: 11. Inserting these values into equation (1) above:

Adjusted staleness score=$(81/3^2+60/2^2+11/1^2)/(1/1^2+1/2^2+1/3^2)$

Adjusted staleness score=25.7.

Within the numerator of the "adjusted staleness score" equation, the folder score of the folder in which the document resides is a numerator immediately over the denominator having a value of n=1 (the lowest value denominator). A folder score of the folder containing all other folders, i.e., the general, highest level folder, is a numerator for the highest value denominator. The value of the denominator for intermediate folders increases with each degree of separation from the immediate folder. Thus, the immediate folder may have a greater effect on the staleness score than the intermediate folders. Also, the immediate folder and the intermediate folders may have a greater effect on the staleness score than the general, higher level folder.

Figure 5:
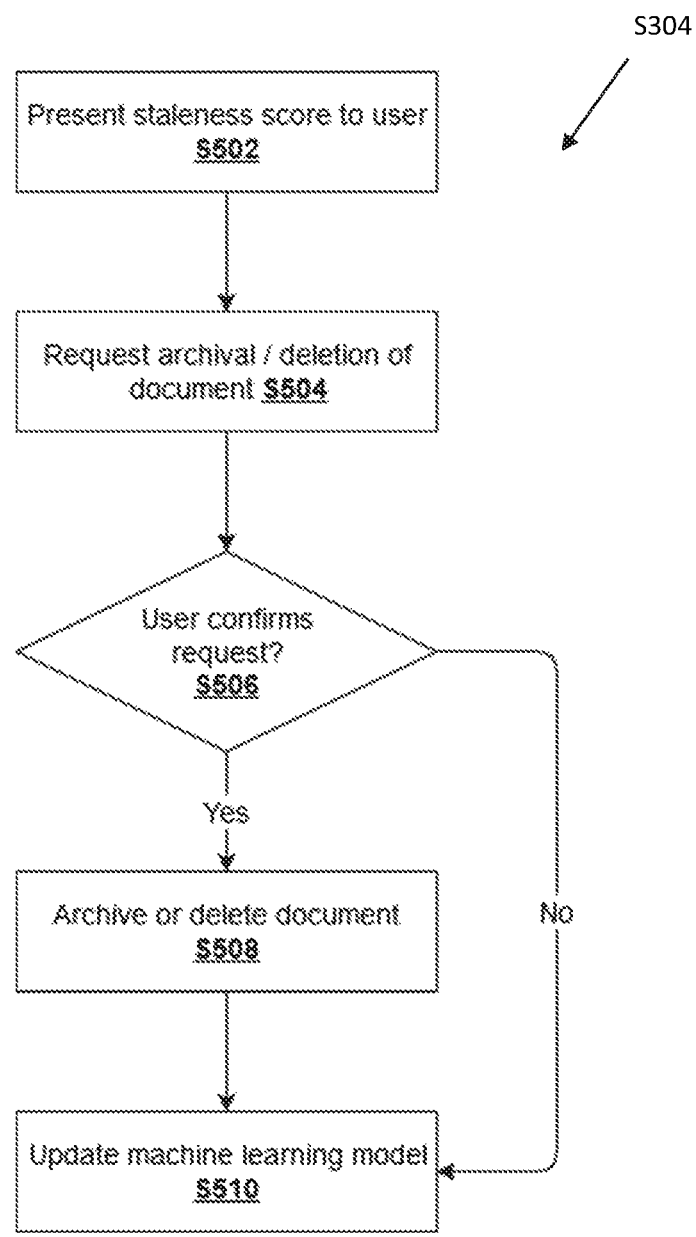
FIG. 5 illustrates a flow chart for performing a second phase of the adaptive method illustrated in FIG. 2.

With reference to FIG. 5, after completing step S302, the system may proceed to step S304—updating the machine learning model. Step S304 may begin at step S502, which is presenting to the user a document having a staleness score that equals or exceeds a threshold value. For example, a high staleness score may represent an older and/or less important document while a lower staleness score may represent a newer and/or more important document. A threshold value of the staleness score may be determined by the user or the threshold value may be programmed into the system.

At step S504, the system may request whether the user would like to archive or delete the document presented. As previously disclosed, an archived document may be a document that is hidden from view in normal interfaces with the document folder in contrast to an unarchived document that may be shown to a user. If archived, the document may be retrieved for later use. If the document is deleted, the document may be irretrievable for later use. Therefore, a deletion staleness score threshold may be higher than an archival staleness score threshold.

The staleness score may be considered a confidence score. For example, the staleness score may be a numerical indication of whether the document should be deleted or archived. The numerical indication may be represented as a percent value of a maximum possible staleness score, for example.

Documents may be suggested for archival or deletion individually or in groups, such as folder-by-folder. The suggestion may be included in regular interface of the document management system, such as where an additional icon is shown next to a document presented to a user to indicate that it is suggested for archive or deletion, or where a sidebar or other interface element suggests documents for archival and/or deletion. Alternatively or in addition, the system may provide a dedicated interface that allows a user to review documents for archival and/or deletion separately from any other document management interface used to view and manipulate documents.

At decision step S506, the system determines whether the user has indicated that the document should be archived or deleted. If the user indicates that the document is to be archived or deleted, the system proceeds to step S508 and archives or deletes the document. If the user indicates that the document is not to be archived or deleted, the system proceeds to step S510.

The user may decide to ignore the delete/archive suggestion and do neither, i.e., the user may override the system's suggestion. For example, if a user likes his or her version of a document and would like to work on it apart from another version of the document, the user may override the system's suggestion. If the user overrides the suggestion, the system may be set to create a tag to suggest to the user, at a future date, archival of the document. The user's preference for the suggested document also may be taken into account when updating the staleness score for the suggested document. For example, if a document is suggested for archival but a user decides not to archive the document and instead spends time updating it, the updated document may now have sufficiently recent last-edit and last-access dates that the staleness score for the document falls below the threshold needed to suggest the document for archival or deletion. Alternatively or in addition, when a user overrides a suggestion to archive or delete a document, this override may itself become a document attribute within the platform, separately from any other common document attributes such as last-edit and last-access dates. This attribute may be used, for example, in future staleness score calculations to assign a lower staleness score than otherwise may be assigned to the document. As another example, the attribute may indicate a running count of the number of times the document has been identified for archive or deletion but subject to an override by the user. The platform may use a threshold for this count to exclude the document from further suggestions to archive or delete. For example, if a document has been suggested for archive and a user overrides the suggestion five times, the document may be automatically excluded from future consideration for archival, even where a staleness score would otherwise indicate it should be suggested. The count may be reset at that point, or after the document has not been considered for archival for a set period of time.

At step S510, the system updates the machine learning model. For example, the machine learning model may be updated to base future document suggestions on data obtained from responses to archival/deletion requests that are denied. Requests that are denied may be due, for example, to a count of unique viewers in the past N months being less important to the user than to the system or a count of other documents that link to the document being less important to the user than to the system. The machine learning model may be updated to base future document suggestions on data obtained from responses to archival/deletion requests that are affirmed. Requests that are affirmed may be due, for example, to a last edit date being more important to the user than the value assigned by the system or a count of unique non-editor viewer in past N months being more important to the user than the value assigned by the system.

The above implementations of the method may be performed on any type of document. For example, the implementations of the method may be performed on documents that already exist in a folder, documents that already exist in the system 100 but are newly introduced to the folder from another folder and documents that do not exist anywhere in the system and are being newly created for introduction into the folder.

The above implementations of the method may be performed on additional documents after or before performing the implementations of the method on a new document. For example, the method may be performed on documents existing in the folder after introduction of the new method. Due to at least one of the attributes of determining a document staleness being the aggregate score of the folder and the staleness score of the folder being based on the documents contained within it, the staleness score of the existing document may be affected by introduction of a new document to the folder.

Therefore, iterations of staleness score generation may help to provide more accurate deletion/archival suggestions. In some implementations of the method, iterations may be conducted on a regular time interval as programmed into the system. In other implementations of the method, iterations may be conducted on a schedule set by the user. n some implementations, previously archived documents may be reevaluated to be un-archived, i.e., moved from an archived status or location to a regular, non-archive status or location. For example, a user may intentionally search for, access, and/or edit the document. As a specific example, a user may search for an older document that has been archived because it was not accessed by any user, such as where it applies to infrequently-used procedures or products. The user may find the document in the archive, open it, and update it. At that point the platform may move the document to its original location before being archived, prompt the user to indicate a location and/or to confirm that the document should be un-archived, or any combination thereof. More generally, the platform may occasionally or regularly reevaluate all documents in the system to determine if they should remain archived or not, for example by re-calculating staleness scores based on the most current model available. In some cases the frequency of such reevaluation, or whether to perform a reevaluation at all, may be determined based on the computing resources needed to perform the reevaluation in comparison to the resources available to the platform generally.

As used herein, a "document" refers to an electronic file that may include text, images, video, or combinations thereof, such as a text document, a multimedia document such as those typically created in a word processor, presentation, publication, or similar program.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

As used herein, a given signal, event or value is "dependent on" a predecessor signal, event or value if the predecessor signal, event or value influenced the given signal, event or value. If there is an intervening processing element, step or time period, the given signal, event or value can still be "dependent on" the predecessor signal, event or value. If the intervening processing element or step combines more than one signal, event or value, the signal output of the processing element or step is considered "dependent on" to each of the signal, event or value inputs. If the given signal, event or value is the same as the predecessor signal, event or value, this is merely a degenerate case in which the given signal, event or value is still considered to be "dependent on" the predecessor signal, event or value. "Responsiveness" of a given signal, event or value upon another signal, event or value is defined similarly.

While the present disclosure is described with reference to implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A method comprising:
   training a machine learning model on a first library of documents to assign staleness scores to documents, each staleness score indicating a confidence that the document to which it is assigned should be archived;
   receiving an identification of a first document not included in the first library of documents;
   applying the machine learning model to the first document to generate a first staleness score;
   based upon a determination that the first staleness score is at least equal to a first threshold, identifying the first document as a candidate to be archived;
   confirming that the first document should be archived; and
   responsive to confirming that the first document should be archived, archiving the first document.

2. The method of claim 1, wherein confirming that the first document should be archived comprises:
 presenting, to a user, the first document and an indication that the first document should be archived; and
 receiving a confirmation from the user that the first document should be archived.

3. The method of claim 2, wherein the indication that the first document should be archived includes a representation of the staleness score.

4. The method of claim 2, further comprising:
 adjusting the machine learning model based upon the confirmation from the user that the first document should be archived.

5. The method of claim 1, wherein the confirming that the first document should be archived comprises:
 determining that no override condition exist for the first document that indicate the first document should not be archived;
 wherein the first document is automatically archived upon determining that no override condition exists.

6. The method of claim 1, wherein, to generate the staleness score, the machine learning model uses one or more attributes selected from the group consisting of: a creation date of the first document, a last edit date of the first document, a count of unique edits of the first document during a time period, a count of unique editors of the first document during a time period, a count of unique viewers of the first document during a time period, a count of unique non-editor viewers of the first document during a time period, a count of other documents linked from the first document, an average staleness score of documents linked to the first document, a count of documents that link to the first document, and an aggregate staleness score of a folder containing the first document.

7. The method of claim 1, further comprising
 receiving an identification of a second document not included in the first library of documents;
 applying the machine learning model to the second document to generate a second staleness score;
 based upon a determination that the second staleness score is at least equal to the first threshold, identifying the second document as a candidate to be archived;
 presenting, to a user, the second document and an indication that the second document should be archived; and
 receiving an indication from the user that the second document should not be archived.

8. The method of claim 7, further comprising:
 adjusting the machine learning model based upon the indication from the user that the second document should not be archived.

9. A non-transitory computer readable medium having instructions that when performed on at least one processor cause the at least one processor to perform the steps comprising:
 training a machine learning model on a first library of documents to assign staleness scores to documents, each staleness score indicating a confidence that the document to which it is assigned should be archived;
 receiving an identification of a first document not included in the first library of documents;
 applying the machine learning model to the first document to generate a first staleness score;
 based upon a determination that the first staleness score is at least equal to a first threshold, identifying the first document as a candidate to be archived;
 confirming that the first document should be archived; and
 responsive to confirming that the first document should be archived, archiving the first document.

10. The non-transitory computer readable medium of claim 9, wherein confirming that the first document should be archived comprises:
 presenting, to a user, the first document and an indication that the first document should be archived; and
 receiving a confirmation from the user that the first document should be archived.

11. The method of claim 10, wherein the indication that the first document should be archived includes a representation of the staleness score.

12. The non-transitory computer readable medium of claim 10, further comprising:
 adjusting the machine learning model based upon the confirmation from the user that the first document should be archived.

13. The non-transitory computer readable medium of claim 9, wherein the confirming that the first document should be archived comprises:
 determining that no override condition exist for the first document that indicate the first document should not be archived;
 wherein the first document is automatically archived upon determining that no override condition exists.

14. The non-transitory computer readable medium of claim 9, wherein, to generate the staleness score, the machine learning model uses one or more attributes selected from the group consisting of: a creation date of the first document, a last edit date of the first document, a count of unique edits of the first document during a time period, a count of unique editors of the first document during a time period, a count of unique viewers of the first document during a time period, a count of unique non-editor viewers of the first document during a time period, a count of other documents linked from the first document, an average staleness score of documents linked to the first document, a count of documents that link to the first document, and an aggregate staleness score of a folder containing the first document.

15. The non-transitory computer readable medium of claim 9, further comprising
 receiving an identification of a second document not included in the first library of documents;
 applying the machine learning model to the second document to generate a second staleness score;
 based upon a determination that the second staleness score is at least equal to the first threshold, identifying the second document as a candidate to be archived;
 presenting, to a user, the second document and an indication that the second document should be archived; and
 receiving an indication from the user that the second document should not be archived.

16. The non-transitory computer readable medium of claim 15, further comprising:
 adjusting the machine learning model based upon the indication from the user that the second document should not be archived.

\* \* \* \* \*